United States Patent
Rakshit et al.

(10) Patent No.: US 11,625,364 B2
(45) Date of Patent: Apr. 11, 2023

(54) COGNITIVE SYNCHRONIZATION OF DIGITAL FILES

(71) Applicant: International Business Machines Corporation, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 500 days.

(21) Appl. No.: 16/733,553

(22) Filed: Jan. 3, 2020

(65) Prior Publication Data

US 2021/0209065 A1 Jul. 8, 2021

(51) Int. Cl.
*G06F 16/178* (2019.01)
*G06N 3/08* (2006.01)

(52) U.S. Cl.
CPC .............. *G06F 16/178* (2019.01); *G06N 3/08* (2013.01)

(58) Field of Classification Search
CPC ................................ G06F 16/178; G06N 3/08
See application file for complete search history.

(56) References Cited

U.S. PATENT DOCUMENTS

| | | | |
|---|---|---|---|
| 7,280,996 B2* | 10/2007 | Hayakawa | G06F 16/273 707/621 |
| 7,877,356 B1 | 1/2011 | Guilheneuf et al. | |
| 8,640,257 B1 | 1/2014 | Sherrets et al. | |
| 8,965,983 B2 | 2/2015 | Costenaro et al. | |
| 9,569,406 B2 | 2/2017 | Shaver | |
| 9,716,609 B2* | 7/2017 | de Vries | H04L 29/06027 |

(Continued)

FOREIGN PATENT DOCUMENTS

EP 2637368 A1 11/2013

OTHER PUBLICATIONS

Terry Gaul, Pay Per Use Licensing: Its Time Has Come, Wibu Systems, Nov. 7, 2017, https://www.wibu.com/us/blog/article/pay-per-use-licensing-its-time-has-come.html (Year: 2017).*

*Primary Examiner* — Allen S Lin
(74) *Attorney, Agent, or Firm* — Garg Law Firm, PLLC; Rakesh Garg; Michael O'Keefe (57) ABSTRACT

An embodiment includes receiving, by a processor, an indication that a first device transmitted a file having tracking metadata to a second device. The embodiment also includes receiving, by the processor, an indication of a modification to the file by the second device. The embodiment also includes evaluating, by the processor, the modification to the file using a cognitive process that analyzes the modification as it relates to profile information for a user and generates a significance value associated with the change. The embodiment also includes automatically initiating, by the processor and responsive to the generating of the significance value, a selected responsive action from among a plurality of responsive actions based at least in part on the significance value, where the automatic initiation of the selected responsive action includes automatic transmission of a notification to the first device regarding the modification to the file.

9 Claims, 5 Drawing Sheets

(56) References Cited

U.S. PATENT DOCUMENTS

| | | | |
|---|---|---|---|
| 2008/0222212 A1 | 9/2008 | Prasad et al. | |
| 2012/0054683 A1* | 3/2012 | Sands | G06F 3/04886 |
| | | | 715/825 |
| 2013/0060869 A1* | 3/2013 | Davis | G06Q 50/01 |
| | | | 709/206 |
| 2013/0332856 A1 | 12/2013 | Sanders et al. | |
| 2020/0035249 A1* | 1/2020 | Choi | B60K 35/00 |

* cited by examiner

COGNITIVE SYNCHRONIZATION OF DIGITAL FILES

TECHNICAL FIELD

The present invention relates generally to a method, system, and computer program product for digital files management. More particularly, the present invention relates to a method, system, and computer program product for cognitive synchronization of digital files.

BACKGROUND

Various managed media hosting services exist that include a central server for facilitating the synchronization of changes to a managed library of media files between two or more registered devices according to pre-established synchronization policies. For example, synchronization policy might indicate that the central server will propagate changes made to a managed file by a registered user using a registered device to the central server and to all other copies on other registered devices. According to this policy, when a change is made to a managed file on a registered device, the device will send a synchronization message to the central server. The central server will respond to the synchronization message according to pre-established synchronization policy by updating the centrally stored copy of the file, by issuing synchronization messages to other registered devices that are storing a copy of the file. The synchronization message informs the other registered devices about the changes to the file and instructs the other registered devices to make the same changes to any local copy of the file stored thereon. While this policy is in effect, the central hosting service will continue accordingly unless a policy change is made, for example to halt synchronization for a certain file or for a certain registered device.

SUMMARY

The illustrative embodiments provide for cognitive synchronization of digital files. An embodiment includes receiving, by a processor, an indication that a first device transmitted a file having tracking metadata to a second device. The embodiment also includes receiving, by the processor, an indication of a modification to the file by the second device. The embodiment also includes evaluating, by the processor, the modification to the file using a cognitive process that analyzes the modification as it relates to profile information for a user and generates a significance value associated with the change. The embodiment also includes automatically initiating, by the processor and responsive to the generating of the significance value, a selected responsive action from among a plurality of responsive actions based at least in part on the significance value, where the automatic initiation of the selected responsive action includes automatic transmission of a notification to the first device regarding the modification to the file. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that managed file hosting services require the use of a central server that stores information about registered users and managed files, and is therefore limited to use by the registered users working with the managed files. The illustrative embodiments further recognize that it is not always convenient or practical for users to utilize such managed file hosted services. For example, there are times when users want to collaborate on a project that would benefit from keeping file updates synchronized among the different users, but for various reasons the users may not be able to utilize a common managed file hosting service. In some scenarios, the collaborating users may be from different organizations that utilize different hardware and/or software resources, so they are able to share files but are not able to utilize a common file management system.

The illustrative embodiments further recognize that managed file hosting services enforce synchronization rules without regard to whether a user wants to incorporate all of the changes made by other users. For example, there are times when users may not fully understand or consider that their locally-stored copy of a file may be subject to changes by other users. In one such scenario, a first user stores a local copy of a managed file for an extended period of time, and return to that file later expecting the file to be unchanged. However, instead the first user finds that the file has been updated with one or more unwanted changes due to changes by other users being synchronized with that file according to the file management system's synchronization policies.

The illustrative embodiments recognize that the presently available file management tools or solutions do not address these needs or provide adequate solutions for these needs. The illustrative embodiments used to describe the invention generally address and solve the above-described problems and other problems related to file sharing and synchronization according to a cognitive process that offers improved flexibility for file sharing and accounts for users wanting to incorporate some changes without necessarily wanting to incorporating all changes to a shared file.

The illustrative embodiments recognize that there is a need to improve the ability to collaborate and synchronize files through a variety of communication channels that are available for transmitting and receiving digital files between computing devices. As used herein, the term "file" refers to any collection of data that is identifiable by a user using a computing device as an electronic object that can be stored in electronic memory, modified using a computing device, and shared with other computing devices by one or more electronic communication protocols. Thus, an electronic document, a digital image, and a digital audio file are all examples of "files" as used herein.

In an embodiment, user devices can include any of a variety of computing devices described herein that are capable of file-transfer communications with other computing devices. This communication may happen via any suitable electronic communication protocol including, for example, a text or Multimedia Messaging Service (MMS) message, an email, or a peer-to-peer connection, such as a peer-to-peer Wi-Fi, Bluetooth® (BLUETOOTH® is a registered trademark of Bluetooth SIG, Inc., Kirkland, Wash., U.S.A.), or Near-field communication (NFC) connection. In some embodiments, the file transfer can take place directly from a memory device associated with the first user to a user device associated with the second user, for example from a Universal Serial Bus (USB) flash drive associated with the first user to a computing device associated with the second user via a USB port on the computing device.

While embodiments disclosed herein refer to first and second user devices, in alternative embodiments the files may instead be associated with the respective users while being device-agnostic. For example, in some embodiments, the files are transferred via email from the first user to the second user, which allows the first user to send the file from any device that can access an email account, and likewise allows the second user to receive the file at any device that can access an email account. Also, in some embodiments, the first and/or second user stores their copy of the file on a cloud storage system where it is accessible from more than one of the first or second user's devices. As another example, in some embodiments, the first and/or second user stores their copy of the file on a removable memory device, for example a USB flash drive.

In some embodiments, a cognitive file synchronization environment includes a first user device having a copy of a file stored in its local memory and a second user device having a copy of the same file stored in its local memory. Once the second user device makes a modification to the copy of the file stored on the second user device, a file tracking system evaluates the change made to the file. The file tracking system uses a cognitive analysis to derive a significance value that indicates a predicted level of interest a user associated with the first user device will have in the modification that was made to the file. The file tracking system then uses the significance value to determine what further action to take, if any, for issuing a notification to the first user device regarding the file change. In some embodiments, the file tracking system is hosted on one or more user devices. In some embodiments, the file tracking system is hosted on a server or other computing device.

In some embodiments, a cognitive file synchronization environment includes a first user device that transmits a copy of a file stored in its local memory to a second user device. The second user device receives the file and stores the file in its local memory. In some embodiments, the file transfer is initiated by the first user device that transmits a message to the second user device. In some embodiments, the file transfer is initiated by the second user device that transmits a request for a copy of the file to the first user device, which in turn responds to the request with a transmission of a copy of the file.

In some embodiments, the first user device includes a file monitoring service that attaches a unique token to metadata that is embedded in the file sent to the second user device. The second user device receives the file with the unique token and stores the file in its local memory. In some embodiments, the second user device also has a file monitoring service that interacts with the token embedded in the file. For example, if any changes are made to the file, the token requests that the file monitoring service notify the file tracking system for possible synchronization with the first user. In some embodiments, the file monitoring service monitors files being stored or modified by the second user device for metadata that indicates that the file monitoring service should notify the file tracking system about modifications to that file.

In some embodiments, the first user device includes the file monitoring service that attaches a unique token to metadata that is embedded in the file sent to the second user device and further notifies a file tracking system about the file transfer by sending a file transfer record to the file tracking system. In some embodiments, the file transfer record includes data identifying one or more of the sending party, the sending device, the receiving party, the receiving device, and a unique identifier associated with the token embedded in the file. The file tracking system stores the file transfer record in a file tracking memory that maintains an association of the unique identifier of the token with the one or more of the identities of the sending party, the sending device, the receiving party, and the receiving device such that looking up the unique identifier of the token allows the file tracking system to cross-reference the unique identifier of the token with the one or more of the identities of the sending party, the sending device, the receiving party, and the receiving device. In some embodiments, the second user device has a file monitoring service that recognizes the token stored in the file and, as a result, monitors the file for changes made by the second user device. If the second user device makes any changes to the file, the file monitoring service notifies the file tracking system with the token information and the change information.

In some embodiments, the file tracking system receives a change notification from the second user device that includes the token information and the change information. In some embodiments, the file tracking system checks the received token information for a unique identifier, then searches the file tracking memory for a file transfer record stored therein that includes the unique identifier. Upon finding the file transfer record that includes the unique token identifier, the file tracking system obtains the associated identity of the sending user and/or sending device, which in this scenario is the first user device. In some embodiments, the file tracking system also, or alternatively, retrieves the associated user information, which in this scenario is the first user.

In some embodiments, the file tracking system also stores user profile information about each of the first and second users. For example, the user profile information can include a user's name and/or demographic information. The user profile information can also include user preference information of any kind that would be useful for training a cognitive analyzer to recognize which file changes would be of interest to the user and which file changes would not be of interest to the user.

For example, in some embodiments, the user profile information can include an interest profile that is based on the user's responses to a survey and then is used as training data to initially train a machine learning model. As used herein, the term "training data" refers to information utilized to train (e.g., tune or teach) a machine learning model. For example, in some embodiments, the training data utilizes user characteristics from a number of the user's responses to survey questions, user profile data provided by the user from other systems (e.g., a social networking profile), a historical record of previous file transfers, and a historical record of modifications previously made to other files. In some embodiments, the user profile accrues over time, providing additional training data that is used to update the training of the machine learning model.

In some embodiments, the file tracking system receives a change notification from the second user device that includes the token information and the change information. For example, in some embodiments, the file is a media file, such as an image or a video file. In some such embodiments, the change information includes information about changes to the media file, such as cropping an image, applying a filter to an image, making color-correction changes to an image or video, or trimming a video. In another example, in some embodiments, the file is a word processing file, and the change information includes information about changes to the text in the file or about changes to stylistic aspects of the file.

In some embodiments, the change information includes a copy of the changed file. In some such embodiments, the file tracking system includes a file comparison module for receiving the copy of the changed file and a copy of the original file and perform a comparison of the two files. The file comparison module then conditions, formats, and/or filters the resulting change information to prepare it as input data for a cognitive modification analysis module.

In some embodiments, the change information includes a description of the changes made to the file. In some such embodiments, the file comparison module conditions, formats, and/or filters the change information to prepare it as input data for a cognitive modification analysis module. Alternatively, in some embodiments, the file comparison module checks the change information by retrieving a copy of the changed file and a copy of the original file and performing a comparison of the two files. The file comparison module then conditions, formats, and/or filters the resulting change information to prepare it as input data for a cognitive modification analysis module.

In some embodiments, the file tracking system includes a cognitive modification analysis module for performing a cognitive analysis of the modifications to the file as it relates the first user's profile to derive a level of interest the first user will likely have with regards to the modifications. In some embodiments, the cognitive modification analysis module includes an artificial neural network, for example a deep neural network. In some embodiments, the neural network is trained to categorize file modification data based on training data about the user. For example, the training data can initially be based on the user's interest profile, which is based on the user's characteristics as determined based on a number of the user's responses to survey questions, and/or user profile data provided by the user from other systems (e.g., a social networking profile). Gradually, over time as the user continues to use the file tracking system, the training data will grow to include records of file transfers and records of modifications that the user previously made to other files.

In some embodiments, the analysis performed by the cognitive modification analysis module includes comparing the current modification to the user's prior modifications. For example, if a user has applied a similar filter and color correction to similar images in the past, they are likely to be interested in this modification.

In some embodiments, the analysis performed by the cognitive modification analysis module includes observing correlations with the user's interest profile. For example, in some embodiments, the cognitive modification analysis module determines whether an image file being modified includes an object that is likely to be of interest to the user, or determines whether a document file being modified includes a topic that is likely to be of interest to the user. For example, if the user's profile includes an indication that the user has an interest in horticulture, then a modification to a picture of a flower or a modification to a document related to landscaping is considered to likely be of interest to the user.

In some embodiments, the analysis performed by the cognitive modification analysis module is based at least in part on the user's own use of media. For example, in some embodiments, the cognitive modification analysis module factors in the user's use of media on their mobile device, on their computer, and/or on social media accounts that the user has allowed the file tracking system to view. For example, if the user has made use of an image that is similar to a modified image, then the modified image is considered to likely be of interest to the user.

In some embodiments, the analysis performed by the cognitive modification analysis module is based at least in part on the user's relation to the modification being made. For example, in some embodiments, the cognitive modification analysis module identifies that the change is being made to a document that includes the user's professional profile, so the changed file will likely be of interest to the user, whereas a change to a photograph that involves cropping the user out of the image will not be likely to be of interest to the user.

In some embodiments, the analysis performed by the cognitive modification analysis module is based at least in part on the significance of the change being made. For example, in some embodiments, the cognitive modification analysis module considers that the more significant the change to a file, the greater the possibility that the user will be interested in see that modification. On the other hand, a small change to an image that changes a minor detail is less likely to be of interest to the user.

In some embodiments, the cognitive modification module performs an analysis of the file modification using one or more of the criteria described herein to derive a significance value that indicates a predicted level of interest the first user will have in the modification that was made to the file. The file tracking system then uses the significance value to determine what further action to take, if any, for issuing a notification to the first user device regarding the file change.

In some embodiments, if the significance value is above a defined threshold for the first user's interest level in the file modification, then the first user will be alerted to the modification. In some embodiments, the significance value is compared to multiple threshold values, and the type of notification provided to the first user, if any, depends on which threshold values the significance score exceeded, if any. For example, if the significance value exceeds the higher of two threshold values, the user is alerted with a text message about the modification, whereas if the significance value exceeds only the lower of two threshold values, the user is alerted through a periodic summary email that includes a list of such modifications.

In some embodiments, if the significance value does not exceed the only or the lowest threshold value, the system discards the change or stores the change in a log file accessible by the first user in the event that the user wants to review such low-scoring modifications. In some embodiments, if the second user modified a file is such a way that the second user feels it will be of interest to the first user, the second user can send a message to the file tracking system to request that the first user be notified about the changes to the file regardless of the significance value. If the file tracking system receives such a message, the file tracking system will respond to the message by notifying the first user about the file changes as requested by the second user.

In some embodiments, if the significance value exceeds one or more threshold values, the modified file is automatically sent to the first user or a link to the modified file is automatically sent to the first user. In some embodiments, if the significance value exceeds one or more threshold values, a user notification module sends a notification to the user in one or more of any desired communication protocols, for example via a text or Short Messaging Service (SMS) message, via email, or via a peer-to-peer connection, such as a peer-to-peer Wi-Fi, Bluetooth, or NFC connection next time the modifying user is within close enough proximity to the first user. In some embodiments, in the case of file transfers that involve relatively close proximity of the two devices, such as via Bluetooth or NFC connections, the first user may not be able to establish a channel of communication after a significant modification has taken place. In some such embodiments, the user notification module tries to find an alternative communication channel for communicating the change to the first user. In some embodiments, such as if an alternative channel cannot be found, the user notification system flags the need to transfer the modification and the transfer takes place the next time the two devices are within close enough proximity to each other and the users re-establish a connection between the two devices.

In some embodiments, if the file has been in the possession of multiple users, when one of the multiple users makes a modification to the file, the file tracking system performs a cognitive analysis for each of the other users and makes an independent determination for each of the other users as to whether the users would be likely to be interested in the change made to the file. In some embodiments, for those users determined to be interested in the change, each recipient where the change should be sent to will receive the modification in individual transfers (for example a person-to-person direct SMS message rather than group message).

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
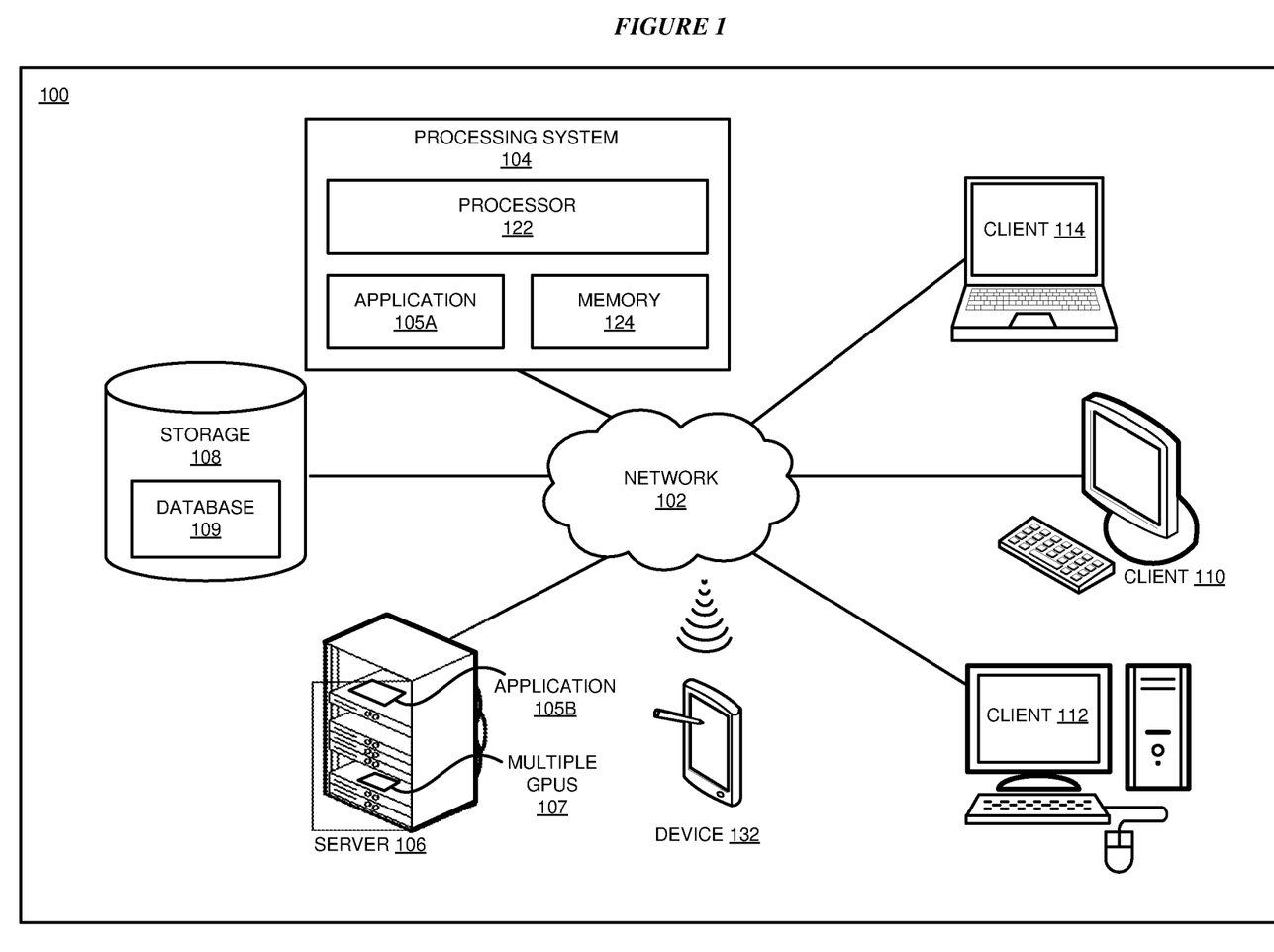
FIG. 1 depicts a block diagram of a network of data processing systems in which illustrative embodiments may be implemented.
Figure 2:
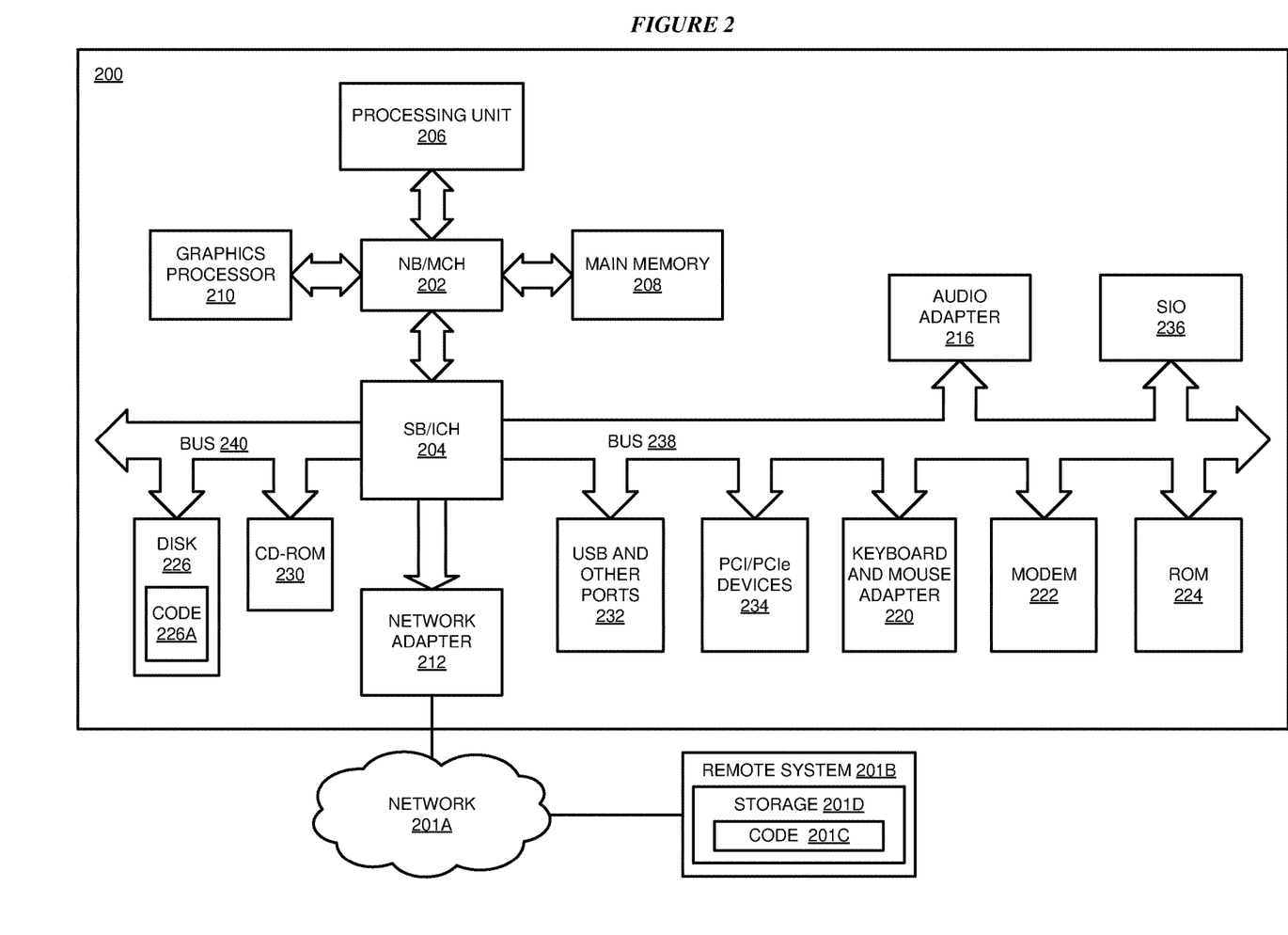
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes neural network application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by neural network application 105B such as initiating processes described herein of the neural network. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of neural network application 105A of data processing system 104 and neural network application 105B of server 106 implements an embodiment of a neural network, such as a DNN, as described herein. In a particular embodiment, the neural network is implemented using one of network application 105A and network application 105B within a single server or processing system. In another particular embodiment, the neural network is implemented using both network application 105A and network application 105B within a single server or processing system. Server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
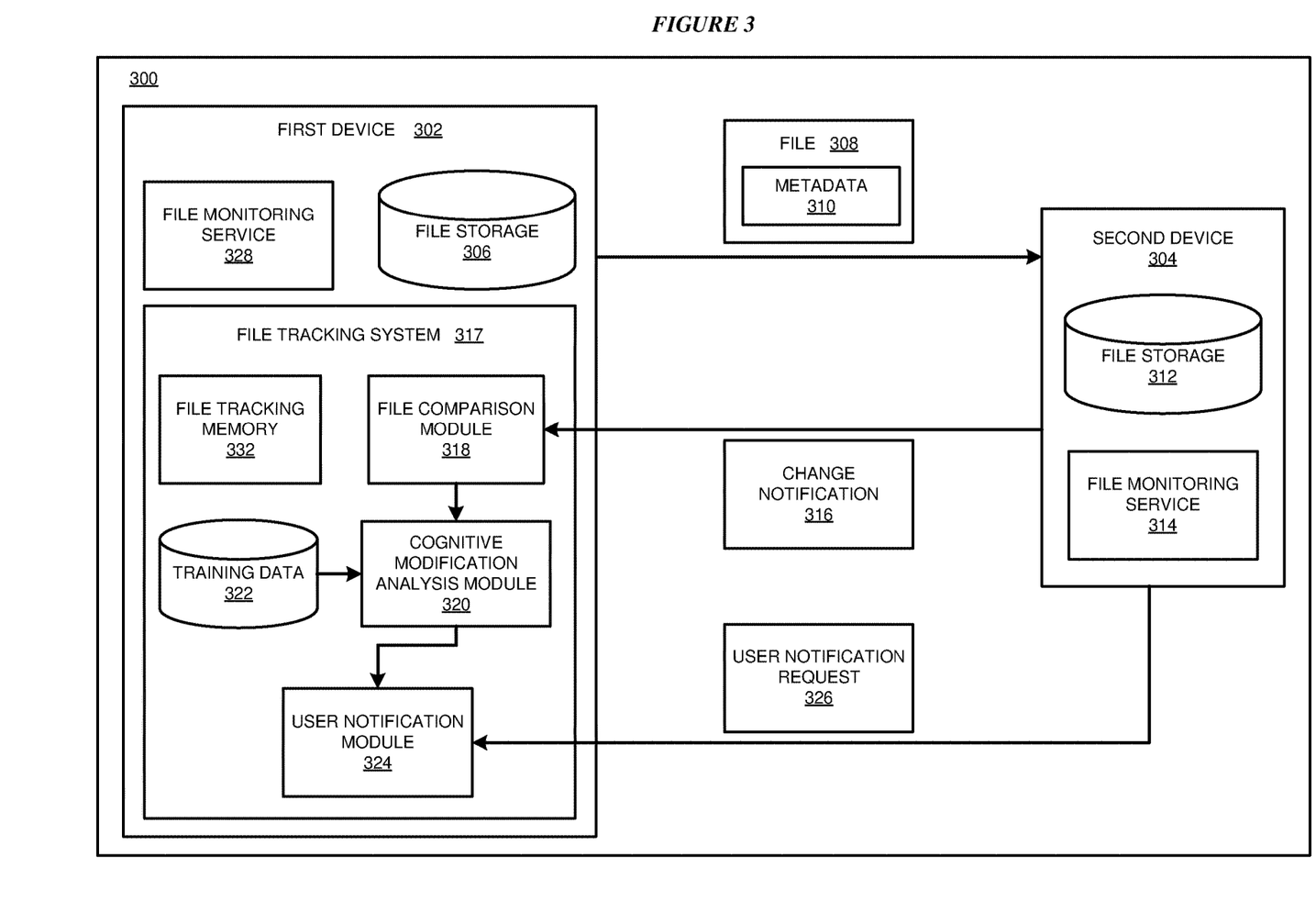
FIG. 3 depicts a block diagram of an example configuration for providing a cognitive synchronization of digital files in accordance with an illustrative embodiment.

With reference to FIG. 3, this figure depicts a block diagram of an example configuration 300 in accordance with an illustrative embodiment. The example embodiment includes a first user device 302 and a second user device 304. In a particular embodiment, the first user devices 302 is an example of processing system 104 or server 106 and the second user device 304 is an example of device 132 or clients 110, 112, 114 in FIG. 1. Also, the first user device 302 hosts a file tracking system 317, which is an example of application 105A/105B in FIG. 1.

In some embodiments, the file tracking system 317 includes a file comparison module 318, a cognitive modification analysis module 320, training data memory 322, a user notification module 324, and a file tracking memory 332. In alternative embodiments, the file tracking system 317 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications. In one alternative embodiment described in connection with FIG. 4, the file tracking system can be located on a separate computing device, such as a server, instead of on one of the user devices.

In some embodiments, a cognitive file synchronization environment 300 includes a first user device 302 that transmits a copy of a file 308 stored in its local memory 306 to a second user device 304. The second user device 304 receives the file 308 and stores the file 308 in its local memory 312. In some embodiments, the first user device 302 includes a file monitoring service 328 that attaches a unique token to metadata 310 that is embedded in the file 308 sent to the second user device 304. The second user device 304 receives the file 308 with the unique token 310 and stores the file 308 in its local memory 312. In some embodiments, the second user device 304 also has a file monitoring service 314 that interacts with the token 310 embedded in the file 308. For example, if any changes are made to the file 308, the token requests that the file monitoring service 314 notify the file tracking system 317 for possible synchronization with the first user.

In some embodiments, the first user device 302 further notifies the file tracking system 317 about the file transfer by sending a file transfer record to the file tracking system 317. In some embodiments, the file transfer record includes an indication of one or more of the sending party, the sending device, the receiving party, the receiving device, and a unique identifier associated with the token embedded in the file 308.

In some embodiments, the second user device 304 has a file monitoring service 314 that recognizes the token stored in the file 308 and, as a result, monitors the file 308 for changes made by the second user device. If the second user device 304 makes any changes to the file 308, the file monitoring service 314 notifies the file tracking system 317 with a change notification 316 that includes token information and the change information.

In some embodiments, the file tracking system 317 receives the change notification 316 from the second user device 304. In some embodiments, the file tracking system 317 checks the received token information for a unique identifier, then searches a file tracking memory 332 for a matching unique identifier. Upon finding the matching unique token identifier, the file tracking memory 332 retrieves the associated user device information, which in this scenario is the first user device 302. In some embodiments, the file tracking system 317 also, or alternatively, retrieves the associated user information, which in this scenario is the first user.

In some embodiments, the file tracking system 317 also stores user profile information about each of the first and second users in the file tracking memory 332. For example, the user profile information can include a user's name and/or demographic information. The user profile information can also include any information that would be useful for training a cognitive analyzer to recognize which file changes would be of interest to the user and which file changes would not be of interest to the user.

For example, in some embodiments, the user profile information can include an interest profile that is based on the user's responses to a survey and then is used as training data to initially train a machine learning model. As used herein, the term "training data" refers to information utilized to train (e.g., tune or teach) a machine learning model. For example, in some embodiments, the training data utilizes user characteristics from a number of the user's responses to survey questions, user profile data provided by the user from other systems (e.g., a social networking profile), a historical record of previous file transfers, and a historical record of modifications previously made to other files. In some embodiments, the user profile accrues over time, providing additional training data that is used to update the training of the machine learning model.

In some embodiments, the change notification 316 includes a copy of the changed file 308. In some such embodiments, the file tracking system 317 includes a file comparison module 318 for receiving the copy of the changed file 308 and a copy of the original file 308 and performs a comparison of the two files. The file comparison module 318 then conditions, formats, and/or filters the resulting change information to prepare it as input data for a cognitive modification analysis module 320.

In some embodiments, the change notification 316 includes a description of the changes made to the file 308. In some such embodiments, the file comparison module 318 conditions, formats, and/or filters the change information to prepare it as input data for a cognitive modification analysis module 320. Alternatively, in some embodiments, the file comparison module 318 checks the change information by for retrieving a copy of the changed file 308 and a copy of the original file 308 and performing a comparison of the two files. The file comparison module 318 then conditions, formats, and/or filters the resulting change information to prepare it as input data for a cognitive modification analysis module 320.

In some embodiments, the file tracking system 317 includes a cognitive modification analysis module 320 for performing a cognitive analysis of the modifications to the file 308 as it relates the first user's profile to derive a level of interest the first user will likely have with regards to the modifications. In some embodiments, the cognitive modification analysis module 320 includes an artificial neural network, for example a deep neural network. In some embodiments, the neural network is trained to categorize file modification data based on training data about the user. For example, the training data can initially be based on the user's interest profile, which is based on the user's characteristics as determined based on a number of the user's responses to survey questions, and/or user profile data provided by the user from other systems (e.g., a social networking profile). Gradually, over time as the user continues to use the file tracking system, the training data will grow to include records of file transfers and records of modifications that the user previously made to other files.

In some embodiments, the analysis performed by the cognitive modification analysis module 320 includes comparing the current modification to the user's prior modifications. For example, if a user has applied a similar filter and color correction to similar images in the past, they are likely to be interested in this modification.

In some embodiments, the analysis performed by the cognitive modification analysis module 320 includes observing correlations with the user's interest profile. For example, in some embodiments, the cognitive modification analysis module 320 determines whether an image file 308 being modified includes an object that is likely to be of interest to the user, or determines whether a document file 308 being modified includes a topic that is likely to be of interest to the user. For example, if the user's profile includes an indication that the user has an interest in horticulture, then a modification to a picture of a flower or a modification to a document related to landscaping is considered to likely be of interest to the user.

In some embodiments, the analysis performed by the cognitive modification analysis module 320 is based at least in part on the user's own use of media. For example, in some embodiments, the cognitive modification analysis module 320 factors in the user's use of media on their mobile device, on their computer, and/or on social media accounts that the user has allowed the file tracking system 317 to view. For example, if the user has made use of an image that is similar to a modified image, then the modified image is considered to likely be of interest to the user.

In some embodiments, the analysis performed by the cognitive modification analysis module 320 is based at least in part on the user's relation to the modification being made. For example, in some embodiments, the cognitive modification analysis module 320 identifies that the change is being made to a document that includes the user's professional profile, so the changed file 308 will likely be of interest to the user, whereas a change to a photograph that involves cropping the user out of the image will not be likely to be of interest to the user.

In some embodiments, the analysis performed by the cognitive modification analysis module 320 is based at least in part on the significance of the change being made. For example, in some embodiments, the cognitive modification analysis module 320 considers that the more significant the change to a file 308, the greater the possibility that the user will be interested in see that modification. On the other hand, a small change to an image that changes a minor detail is less likely to be of interest to the user.

In some embodiments, the cognitive modification module performs an analysis of the file 308 modification using one or more of the criteria described herein to derive a significance value that indicates a predicted level of interest the first user will have in the modification that was made to the file 308. The file tracking system 317 then uses the significance value to determine what further action to take, if any, for issuing a notification to the first user device 302 regarding the file change.

In some embodiments, if the significance value is above a defined threshold for the first user's interest level in the file modification, then the first user will be alerted to the modification. In some embodiments, the significance value is compared to multiple threshold values, and the type of notification provided to the first user, if any, depends on which threshold values the significance score exceeded, if any. For example, if the significance value exceeds the higher of two threshold values, the user is alerted with a text message about the modification, whereas if the significance value exceeds only the lower of two threshold values, the user is alerted through a periodic summary email that includes a list of such modifications.

In some embodiments, if the significance value does not exceed the only or the lowest threshold value, the system discards the change or stores the change in a log file accessible by the first user in the event that the user wants to review such low-scoring modifications. In some embodiments, if the second user modified a file is such a way that the second user feels it will be of interest to the first user, the second user can send a user notification request 326 to the file tracking system 317 to request that the first user be notified about the changes to the file 308 regardless of the significance value. If the file tracking system 317 receives such a message, the file tracking system 317 will respond to the message by notifying the first user about the file changes as requested by the second user 304.

In some embodiments, if the significance value exceeds one or more threshold values, the modified file 308 is automatically sent to the first user or a link to the modified file 308 is automatically sent to the first user. In some embodiments, if the significance value exceeds one or more threshold values, a user notification module sends a notification to the user in one or more of any desired communication protocols, for example via a text or Short Messaging Service (SMS) message, via email, or via a peer-to-peer connection, such as a peer-to-peer Wi-Fi, Bluetooth, or NFC connection next time the modifying user is within close enough proximity to the first user. In some embodiments, in the case of file transfers that involve relatively close proximity of the two devices, such as via Bluetooth or NFC connections, the first user may not be able to establish a channel of communication after a significant modification has taken place. In some such embodiments, the user notification module tries to find an alternative communication channel for communicating the change to the first user. In some embodiments, such as if an alternative channel cannot be found, the user notification system flags the need to transfer the modification and the transfer takes place the next time the two devices are within close enough proximity to each other and the users re-establish a connection between the two devices.

In some embodiments, if the file 308 has been in the possession of multiple users, when one of the multiple users makes a modification to the file 308, the file tracking system 317 performs a cognitive analysis for each of the other users and makes an independent determination for each of the other users as to whether the users would be likely to be interested in the change made to the file 308. In some embodiments, for those users determined to be interested in the change, each recipient where the change should be sent to will receive the modification in individual transfers (for example a person-to-person direct SMS message rather than group message).

Figure 4:
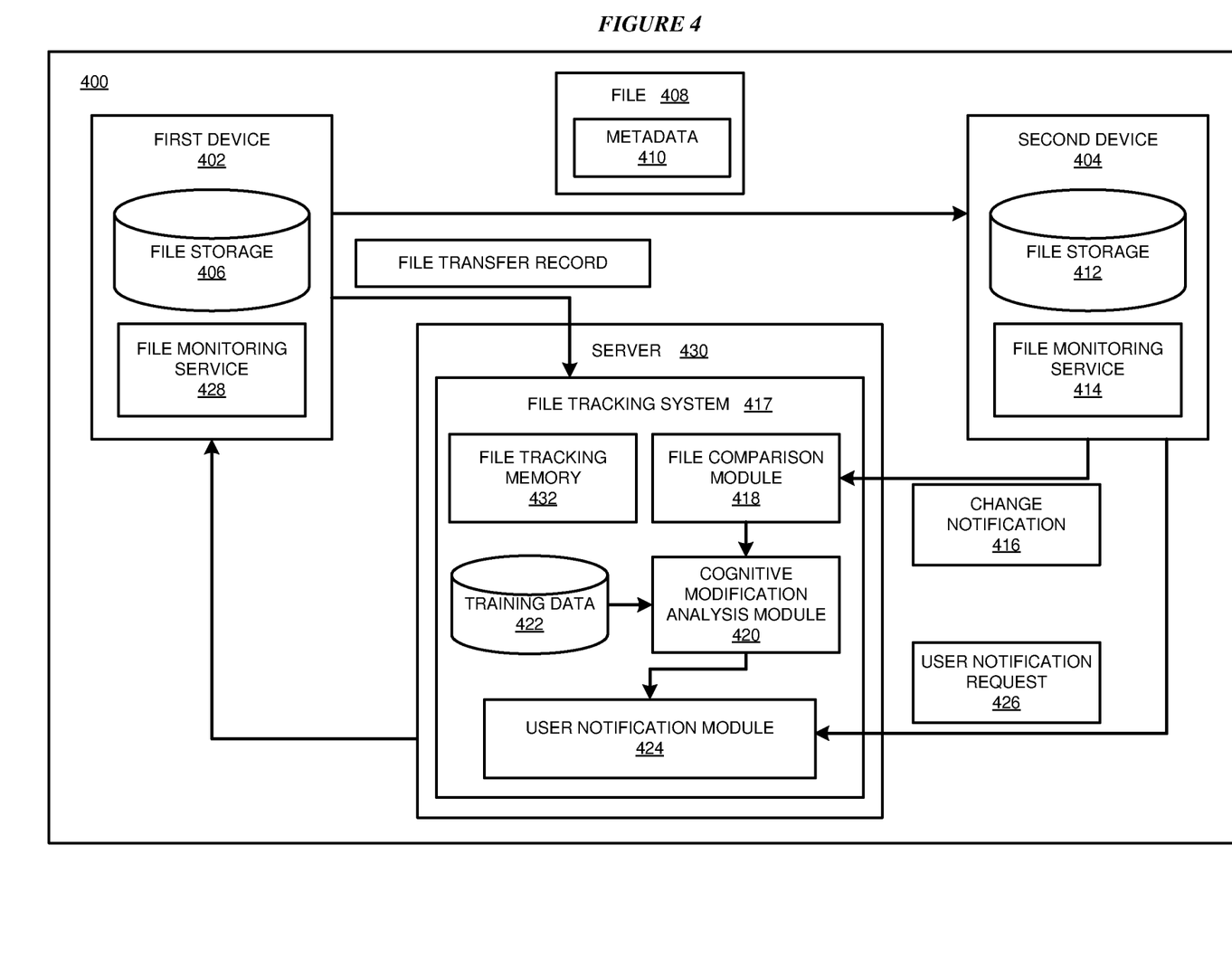
FIG. 4 depicts a block diagram of an example configuration for providing a cognitive synchronization of digital files in accordance with an illustrative embodiment.

With reference to FIG. 4, this figure depicts a block diagram of an example configuration 400 in accordance with an illustrative embodiment. The example embodiment includes a first user device 402, a second user device 404, and a server 430. In a particular embodiment, the server 430 is an example of processing system 104 or server 106 and the first and second user device 402, 404 are examples of device 132 or clients 110, 112, 114 in FIG. 1. Also, the server 430 hosts a file tracking system 417, which is an example of application 105A/105B in FIG. 1.

The embodiment shown in FIG. 4 is similar to the embodiment shown in FIG. 3, except that the file tracking system 417 is hosted on a server 430 rather than on one of the user devices (i.e., first user device 302 in FIG. 3). Therefore, much of the description of FIG. 3 applies equally to FIG. 4, so the description of FIG. 4 is limited to differences from the embodiment shown in FIG. 3.

In some embodiments, a cognitive file synchronization environment 400 includes a first user device 402 that transmits a copy of a file 408 stored in its local memory 406 to a second user device 404 and notifies the file tracking system 417 about the file transfer by sending a file transfer record to the file tracking system 417. In some embodiments, the file transfer record includes an indication of one or more of the sending party, the sending device, the receiving party, the receiving device, and a unique identifier associated with the token embedded in the file 408.

In some embodiments, the first user device 402 includes a file monitoring service 428 that attaches a unique token to metadata 410 that is embedded in the file 408 sent to the second user device 404. The second user device 404 receives the file 408 with the unique token 410 and stores the file 408 in its local memory 412. In some embodiments, the second user device 404 also has a file monitoring service 414 that interacts with the token 410 embedded in the file 408. If the second user device 404 makes any changes to the file 408, the file monitoring service 414 notifies the file tracking system 417 with a change notification 416 that includes token information and the change information.

In some embodiments, the file tracking system 417 receives the change notification 416 from the second user device 404. In some embodiments, the file tracking system 417 checks the received token information for a unique identifier, then searches a file tracking memory 432 for a matching unique identifier. Upon finding the matching unique token identifier, the file tracking memory 432 retrieves the associated user device information, which in this scenario is the first user device 402. In some embodiments, the file tracking system 417 also, or alternatively, retrieves the associated user information, which in this scenario is the first user.

In some embodiments, the file tracking system 417 also stores user profile information about each of the first and second users in the file tracking memory 432. In some embodiments, the user profile information can include an interest profile that is based on the user's responses to a survey and then is used as training data to initially train a machine learning model.

In some embodiments, the change notification 416 includes a copy of the changed file 408. In some such embodiments, the file tracking system 417 includes a file comparison module 418 for receiving the copy of the changed file 408 and a copy of the original file 408 and performs a comparison of the two files. The file comparison module 418 then conditions, formats, and/or filters the resulting change information to prepare it as input data for a cognitive modification analysis module 420.

In some embodiments, the change notification 416 includes a description of the changes made to the file 408. In some such embodiments, the file comparison module 418 conditions, formats, and/or filters the change information to prepare it as input data for a cognitive modification analysis module 420. Alternatively, in some embodiments, the file comparison module 418 checks the change information by retrieving a copy of the changed file 408 and a copy of the original file 408 and performing a comparison of the two files. The file comparison module 418 then conditions, formats, and/or filters the resulting change information to prepare it as input data for a cognitive modification analysis module 420.

In some embodiments, the file tracking system 417 includes a cognitive modification analysis module 420 for performing a cognitive analysis of the modifications to the file 408 as it relates the first user's profile to derive a level of interest the first user will likely have with regards to the modifications. The description of the various aspects of the file tracking system 317, including the description of the cognitive modification analysis module 320, that is provided in connection with FIG. 3 applies equally to the file tracking system 417, including the cognitive modification analysis module 420, shown in FIG. 4, and is therefore not repeated for the sake of clarity and conciseness. One remaining distinction is that communication between the file tracking system 417 and the first device 402 are made between separate devices in FIG. 4 rather than within the same device 302 in FIG. 3. So, for example, if the second user modified the file 408 in such a way that the second user feels it will be of interest to the first user, the second user can sends a user notification request 426 to the server 430 hosting the file tracking system 417 to request that the first user be notified about the changes to the file 408 regardless of the significance value. That notification will be sent from the server 430 to the first device 402 using any suitable communication protocol.

Figure 5:
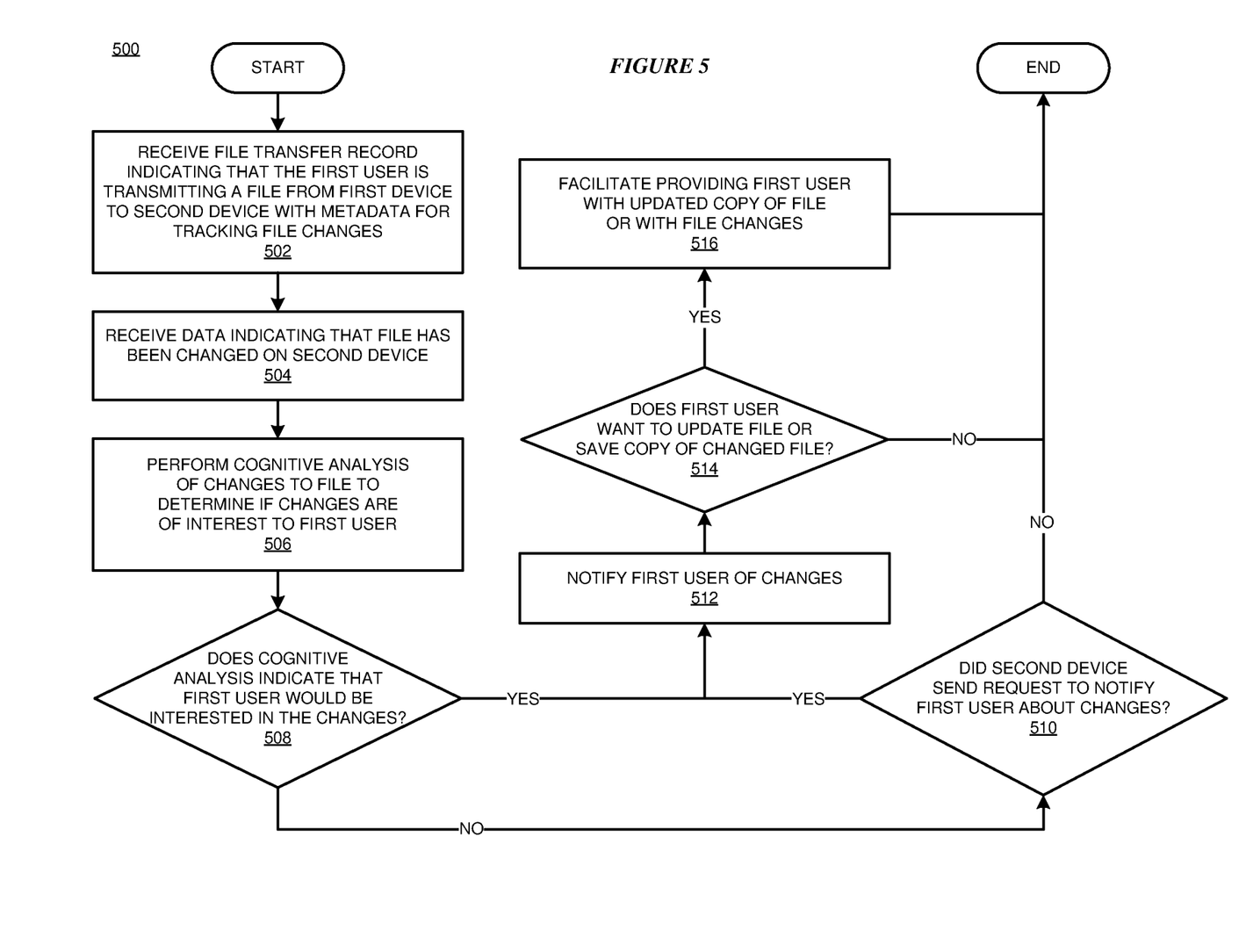
FIG. 5 depicts a flowchart of an example process for providing a cognitive synchronization of digital files in accordance with an illustrative embodiment.

With reference to FIG. 5 this figure depicts a flowchart of an example process 500 for cognitive synchronization of digital files in accordance with an illustrative embodiment. In a particular embodiment, the file tracking system 317 or 417 carries out the process 700.

In an embodiment, at block 402, the process receives a file transfer record indicative of a first user transmitting a file from a first device to a second device with metadata for tracking file changes. Next, at block 404, the process receives data indicating that file has been changed on second device. Next, at block 406, the process performs cognitive analysis of changes to the file to determine if changes are likely to be of interest to first user. In some embodiments, the cognitive analysis is performed using an artificial neural network, for example a deep neural network. In some embodiments, the neural network is trained to categorize file modification data based on training data about the user. For example, the training data can initially be based on the user's interest profile, which is based on the user's characteristics as determined based on a number of the user's responses to survey questions, and/or user profile data provided by the user from other systems (e.g., a social networking profile). Gradually, over time as the user continues to use the file tracking system, the training data will grow to include records of file transfers and records of modifications that the user previously made to other files.

Next, at block 408, the process checks whether the results of the cognitive analysis indicate that first user would be interested in the changes. If not, the process continues to block 410 where the process checks for a request from the second device to notify first user about the changes. If not, the process ends.

If the check at block 408 or 410 is YES, the process continues to block 412 where the process notifies the firsts user about the changes to the file. At block 414, the process checks whether the first user wants a copy of the updated file. If so, the process continues to block 416 where the process facilitates providing the first user with change information or an updated copy of the file. Otherwise, the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
receiving, by a processor, a transfer record indicating that a first device transmitted a file having tracking metadata to a second device, the transfer record comprising a unique identifier associated with a token in the tracking metadata, wherein the unique identifier is associated with an identity of the first device;
retrieving, by the processor from a computer memory, a record that associates a user with the unique identifier and the first device;
receiving, by the processor, a change notification indicative of a modification to content of the file by the second device, the change notification comprising the unique identifier;
evaluating, by the processor, the modification to the file using a trained artificial neural network (ANN), wherein the trained ANN is trained using training data that includes correlations between modifications to files in the training data and the user's interests, and wherein the trained ANN is trained to categorize inputted file modification data according to a predicted level of interest the user will have in corresponding inputted file modifications, wherein the evaluating comprises:
inputting file modification data indicative of the modification into the trained ANN;
evaluating a change to at least one of text in the file and an image in the file; and
generating, by the trained ANN using the file modification data, a significance value indicative of a predicted level of interest the user will have in the modification; and
automatically initiating, by the processor and responsive to the generating of the significance value, a responsive action selected from among a plurality of responsive actions by determining that the significance value satisfies a threshold level of interest associated with the responsive action, wherein the automatic initiation of the selected responsive action includes automatic transmission of a notification to the first device regarding the modification to the file, and wherein the plurality of responsive actions comprises foregoing notifying the first device and disposing of the change notification.

2. The computer implemented method of claim 1, wherein the trained ANN is trained using training data based on an interest profile that comprises at least one of data based on a response by the user to a survey question and profile data provided by the user.

3. The computer implemented method of claim 1, wherein the automatic initiating of the selected responsive action comprises comparing the significance value to a threshold value and determining that the significance value is within a first range of values relative to the threshold value associated with the selected responsive action.

4. A computer usable program product comprising a computer-readable storage device, and program instructions stored on the storage device, the stored program instructions comprising:
program instructions to receive, by a processor, a transfer record indicating that a first device transmitted a file having tracking metadata to a second device, the transfer record comprising a unique identifier associated with a token in the tracking metadata, wherein the unique identifier is associated with an identity of the first device;
program instructions to retrieve, by the processor from a computer memory, a record that associates a user with the unique identifier and the first device;
program instructions to receive, by the processor, a change notification indicative of a modification to content of the file by the second device, the change notification comprising the unique identifier;
program instructions to evaluate, by the processor, the modification to the file using a trained artificial neural network (ANN), wherein the trained ANN is trained using training data that includes correlations between modifications to files in the training data and the user's interests, and wherein the trained ANN is trained to categorize inputted file modification data according to a predicted level of interest the user will have in corresponding inputted file modifications, wherein the program instructions to evaluate comprise:
program instructions to input file modification data indicative of the modification into the trained ANN;
program instructions to evaluate a change to at least one of text in the file and an image in the file; and
program instructions to generate, by the trained ANN using the file modification data, a significance value indicative of a predicted level of interest the user will have in the modification; and
program instructions to automatically initiate, by the processor and responsive to the generating of the significance value, a responsive action selected from among a plurality of responsive actions by determining that the significance value satisfies a threshold level of interest associated with the responsive action, wherein the automatic initiation of the selected responsive action includes automatic transmission of a notification to the first device regarding the modification to the file, wherein the plurality of responsive actions comprises foregoing notifying the first device and disposing of the change notification.

5. A computer usable program product of claim 4, wherein the trained ANN is trained using training data based on an interest profile that comprises at least one of data based on a response by the user to a survey question and profile data provided by the user.

6. The computer usable program product of claim 4, wherein the stored program instructions are stored in a computer readable storage device in a data processing system, and wherein the stored program instructions are transferred over a network from a remote data processing system.

7. The computer usable program product of claim 4, wherein the stored program instructions are stored in a computer readable storage device in a server data processing system, and wherein the stored program instructions are downloaded over a network to a remote data processing system for use in a computer readable storage device associated with the remote data processing system, further comprising:
program instructions to meter use of the computer usable code associated with the request; and
program instructions to generate an invoice based on the metered use.

8. A computer system comprising a processor, a computer-readable memory, and a computer-readable storage device, and program instructions stored on the storage device for execution by the processor via the memory, the stored program instructions comprising:
program instructions to receive, by a processor, a transfer record indicating that a first device transmitted a file having tracking metadata to a second device, the transfer record comprising a unique identifier associated with a token in the tracking metadata, wherein the unique identifier is associated with an identity of the first device;
program instructions to retrieve, by the processor from a computer memory, a record that associates a user with the unique identifier and the first device;
program instructions to receive, by the processor, a change notification indicative of a modification to content of the file by the second device, the change notification comprising the unique identifier;
program instructions to evaluate, by the processor, the modification to the file using a trained artificial neural network (ANN), wherein the trained ANN is trained using training data that includes correlations between modifications to files in the training data and the user's interests, and wherein the trained ANN is trained to categorize inputted file modification data according to a predicted level of interest the user will have in corresponding inputted file modifications,, wherein the program instructions to evaluate comprise:
program instructions to input file modification data indicative of the modification into the trained ANN;
program instructions to evaluate a change to at least one of text in the file and an image in the file; and
program instructions to generate, by the trained ANN using the file modification data, a significance value indicative of a predicted level of interest the user will have in the modification; and program instructions to automatically initiate, by the processor and responsive to the generating of the significance value, a responsive action selected from among a plurality of responsive actions by determining that the significance value satisfies a threshold level of interest associated with the responsive action, wherein the automatic initiation of the selected responsive action includes automatic transmission of a notification to the first device regarding the modification to the file, and wherein the plurality of responsive actions comprises foregoing notifying the first device and disposing of the change notification.

9. The computer system of claim 8,
wherein the trained ANN is trained using training data based on an interest profile that comprises at least one of data based on a response by the user to a survey question and profile data provided by the user.

* * * * *